Patented Feb. 17, 1942

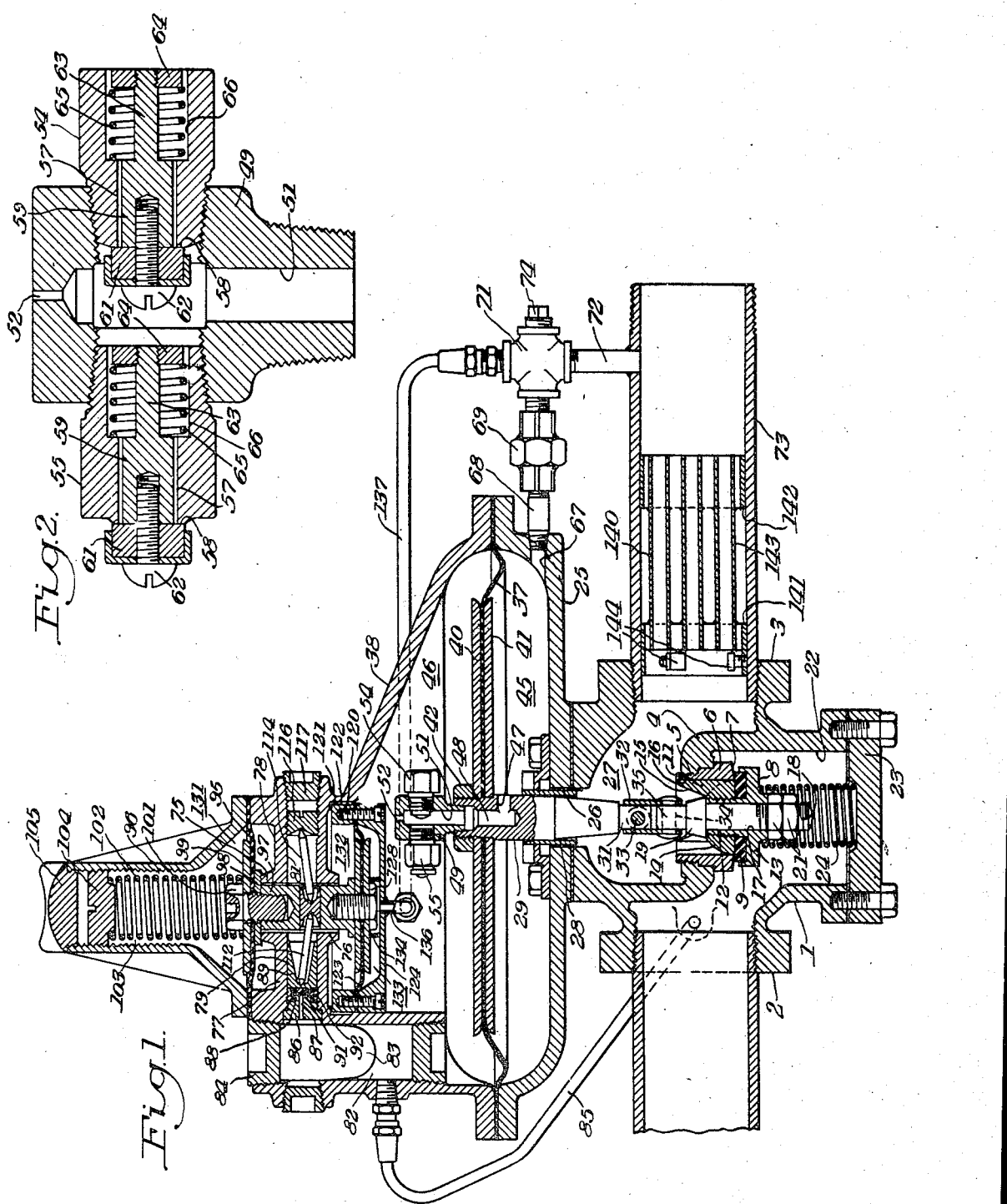

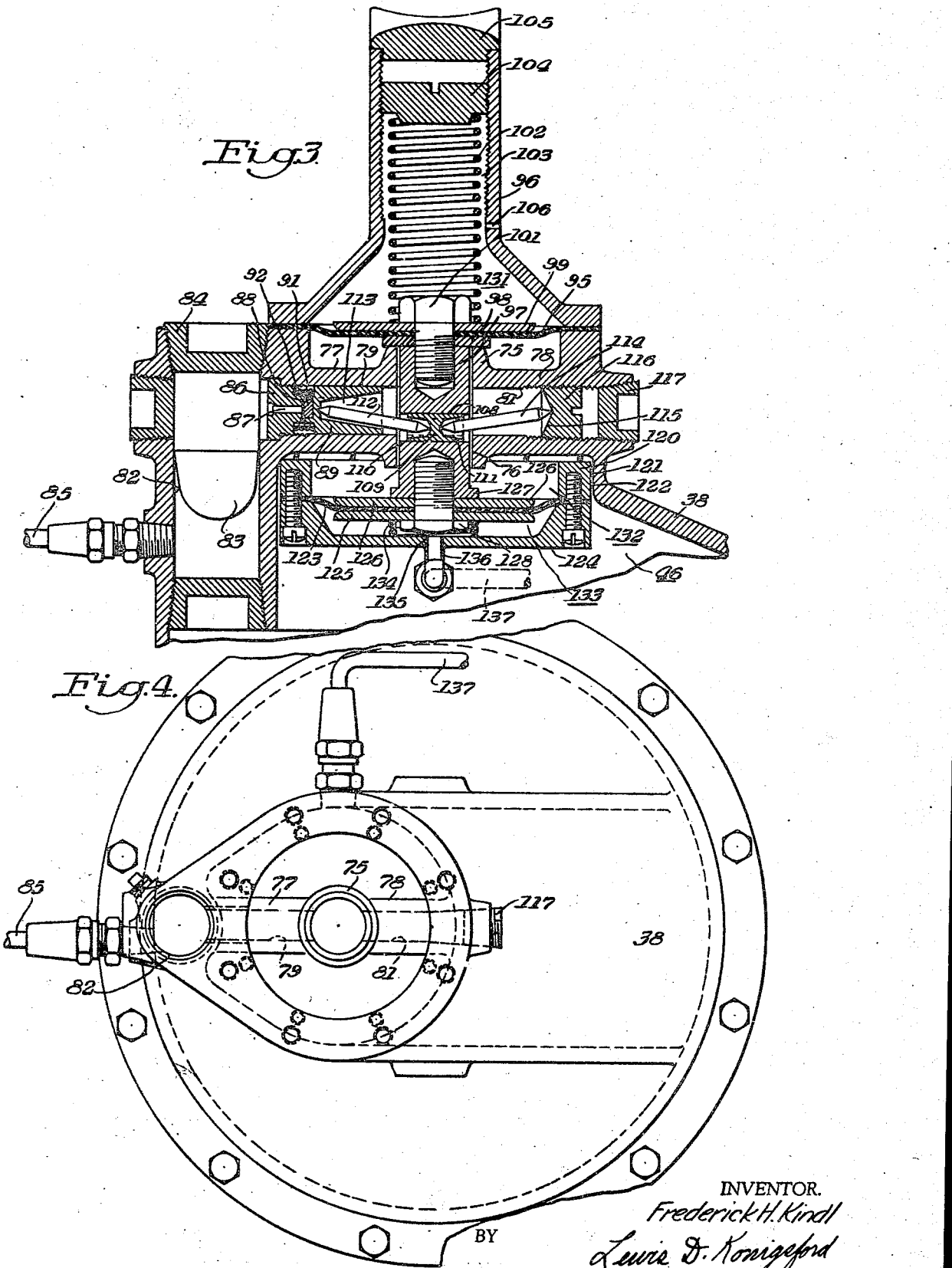

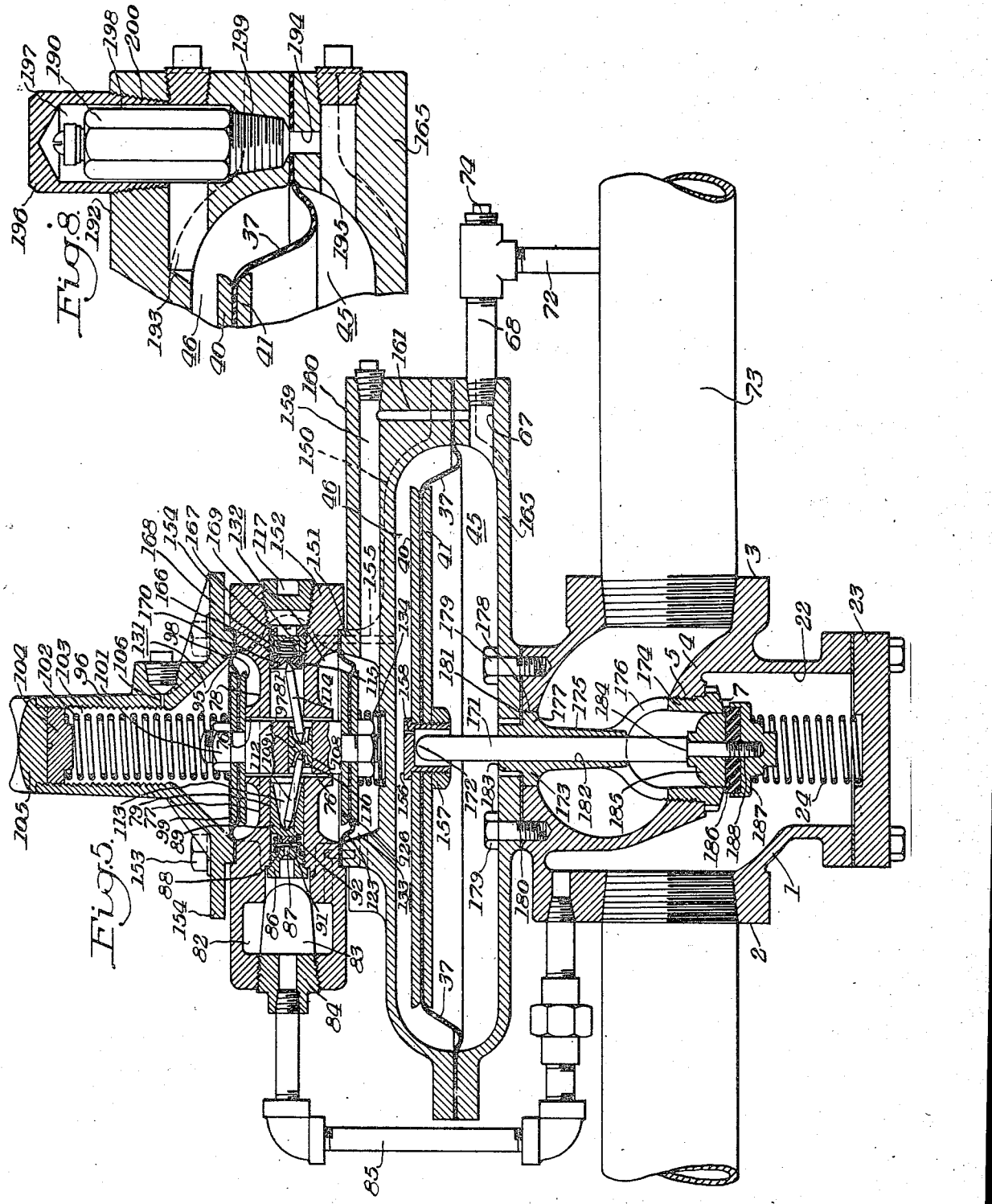

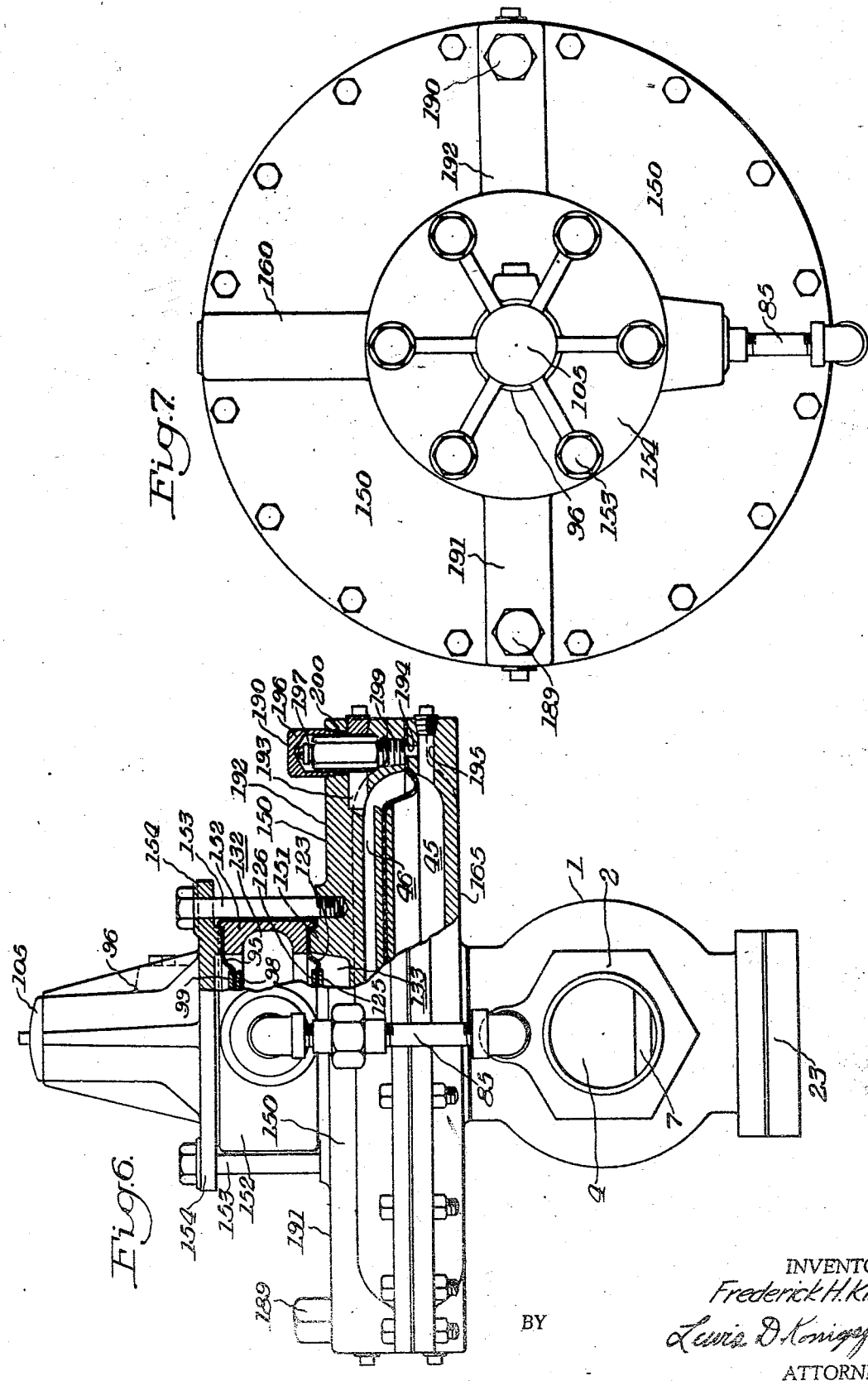

2,273,111

UNITED STATES PATENT OFFICE 2,273,111

PRESSURE CONTROL SYSTEM

Frederick H. Kindl, Pittsburgh, Pa., assignor to Pittsburgh Equitable Meter Company, Pittsburgh, Pa., a corporation of Pennsylvania Application March 6, 1939, Serial No. 260,049

12 Claims. (Cl. 50—11)

The present invention relates to improvements in pilot control and regulating apparatus, particularly applicable for the control of gas pressure in a conduit.

It is an object of the present invention to provide a fluid pressure regulator which will maintain a stable control of the pressure to be regulated.

A further object is the provision of a regulator for maintaining a stable, constantly controlled outlet pressure under varying demands and providing an arrangement for balancing out the effect of changes in inlet pressure.

A further object is the provision of a regulator which will maintain a constant outlet pressure independent of changes in demand.

A further object is the provision of a regulator which has a wide range of outlet pressure control with a low minimum limit.

A further object is the provision of a pilot control regulator system which will maintain a stable constant control of the pressure to be regulated under varying demands, which is independent of changes in inlet pressure and in which the bleed is returned to the outlet conduit of the regulator.

A further object is the provision of a regulator wherein stuffing boxes and the like sealing means are eliminated, thereby increasing the sensitivity of the apparatus.

A further object is the provision of a pilot loading or control regulator wherein the effect of changes in inlet pressure may be balanced out and the sensitivity of control may be adjusted.

A further object is the provision of a pilot regulator system which does not employ the full high pressure for control on the main regulator with the result that the regulator case may be of thinner cross section and lighter weight.

A further object is the provision of a regulator having high capacity, which is compact, and which operates efficiently.

Still another object is the provision of a regulator having means to eliminate turbulence in flow at the control point of the regulator.

According to one feature of the present invention I provide in a pilot loading or controlled regulating system consisting of a main regulator and a pilot regulator, an arrangement whereby the pilot regulator is responsive to a control pressure and serves to provide a pilot flow of fluid exerting a variable pressure on the main regulator from the high pressure side of the conduit or any other suitable source of pressure and embodies means to balance out the effect of changes in pressure of the pilot flow on the pilot regulator control. The main pressure responsive device controlling the main valve, which in the preferred embodiment is a diaphragm, may be directly connected to the regulator valve, or the regulator valve may be separate from the diaphragm.

The flow of fluid supplied to the main regulator may, if desired, be vented to the atmosphere through a suitable restriction. However, I prefer to vent this flow of fluid to the outlet conduit of the regulator, and in the preferred construction I employ a spring or its equivalent to bias the main regulator valve to closed position. A double seated or single seated valve may be employed. Where a single seated valve is employed the inlet pressure may serve to bias the valve, but I prefer to use a spring or weight to insure closing of the valve rather than depend entirely on the inlet pressure. When the diaphragm is separate from the valve, the spring may serve also to maintain the valve stem and diaphragm in engagement. The use of a spring for this purpose also enables the system to control a lower outlet pressure.

When the regulator valve is connected to the diaphragm, the diaphragm itself serves as a damping device to prevent pulsation of the valve. When the valve is separate from the diaphragm I find it desirable to reduce the space above the diaphragm to a small volume in order to damp out vibrations of the diaphragm.

The main valve preferably is of such construction that the ratio of valve travel to valve opening at the beginning of the valve movement is relatively small and becomes increasingly larger as the valve opens. Any suitable form of pilot regulator embodying the pressure balancing means of the present invention may be employed. In the preferred construction the sensitivity and capacity of the system may be varied within certain limits by providing an adjustable limit of travel of the pilot valve. A compact structure is obtained by embodying the pilot regulator in the main regulator case and providing a conduit for the pilot flow or bleed through the case of the main regulator.

The invention will be described in detail in connection with the accompanying drawings, wherein I show a preferred embodiment of the invention by way of example, and wherein:

Figure 1 is a view in vertical section of a preferred modification of the invention, Figure 2 is a sectional view of a detail, Figure 3 is an enlarged vertical section of a preferred pilot regulator, Figure 4 is a plan view of Figure 1 with the pilot cover removed, Figure 5 is a view in vertical section of a further modification, Figure 6 is an end view of Figure 5 partly in section, Figure 7 is a plan view of Figure 5, and Figure 8 is a section view of a modified check valve arrangement.

Referring to the drawings, there is shown a valve casing 1 having an inlet 2 and an outlet 3 separated by a partition or wall 4 having a threaded opening 5 therein. A threaded valve orifice bushing 6 is threaded into the opening 5 and provides a slightly tapered surface 7 against which a valve member 8 is adapted to close. The valve member 8 has an insert 9 of any suitable composition such as natural or synthetic rubber, leather or soft metal, which is held in position by a guide member 11 threaded on a sleeve 12 extending from the backing disk 13 of the valve. Guide member 11 comprises a substantially semi-spherical member 14 having a plurality of wings 15 integral therewith which coact with the wall of orifice 16 of the valve orifice bushing 6 to guide the valve therein. Sleeve 12 has an opening 17 through which passes the valve stem 18 having a head 19 thereon engaging the end of sleeve 12. A plurality of lock nuts 21 hold the valve stem in position for ready removal. An access hole 22 provided in the bottom of the casing 1 is closed by a hand hole plate 23 suitably bolted thereto, and a spring 24 abuts the valve 8 and the hand hole plate 23 to supplement the inlet pressure in maintaining the valve normally in closed position.

The lower half 25 of a diaphragm casing is secured to the top of the valve casing in any suitable manner, and has a hole 26 communicating with outlet chamber 27 of the valve. A stem guide bushing 28 received in the hole 26 provides a close guiding fit on the order of a few thousandths of an inch for a diaphragm stem 29 passing therethrough. The diaphragm stem 29 has a reduced end 31 which receives a coupling sleeve 32 with a small clearance, the sleeve being secured by a rivet 33 to the end thereof and by a rivet 34 to the upper end 35 of the valve stem 18. The rivets 33 and 34 are at right angles to each other and because of the loose fit of sleeve 32 they allow slight pivotal movement of the stems 29 and 18 about the rivets and also allow slight offset movement along the rivets to obtain proper alignment of stems 18 and 29. However, where bushing 28 provides a sufficiently centered guide, this sleeve 32 may be omitted and the valve stem and diaphragm stem made integral.

A diaphragm 37 is clamped at its periphery between the lower half 25 and the top portion of the diaphragm casing. The diaphragm stem 29 has a reduced upper end to receive diaphragm pans or plates 40 and 41 having the diaphragm 37 therebetween, and the diaphragm and pan assembly is held together by a nut 42 threaded onto the end of stem 29 which clamps the diaphragm between the plates. There is thus formed two chambers 45 and 46 on opposite sides of diaphragm 37. Stem 29 has a radial bore 47 connecting with an axial bore 48 terminating in an enlarged threaded portion which receives a fitting 49. Fitting 49 comprises a central plug having a bore 51 therethrough connecting with bore 48 and terminating in a reduced orifice 52, and it will be apparent that the fluid in chamber 46 escapes through the restriction 52 and by means of bores 51, 48, 47 into chamber 45 which connects by a large opening 67 and conduit 68 and union 69 to cross 71, which in turn connects by conduit 72 to a pipe 73 connected to outlet connection 3 of the main valve 1. A plug 74 in the cross 71 may be removed to provide a connection for a pressure gauge to be employed in initially setting up the apparatus.

Check valve fittings of any suitable construction are secured in the fitting 59, one check valve 54 allowing flow from chamber 46 to bore 51 and the other check valve 55 allowing flow from bore 51 into chamber 46. As shown in Figure 2, check valve 54 comprises a threaded body having a bore 57 therethrough terminating in a valve edge 58 and a non-circular guide member in the bore 57 has a valve seat 61 secured thereon by screw 62 which co-operates with valve edge 58. A stem 63 extends from the guide member 59 and has a non-circular nut 64 secured to its end. A spring 65 within the enlarged bore 66 biases the check valve to closed position. Check valve 55 is similar in construction to valve 54 except for reversal of certain parts, and need not be described in detail.

The top casing 38 has a hub 75 (Figures 1 and 3) which is bored at 76 and which has radial spokes 77 and 78 integral with the casing extending therefrom with bores 79 and 81 therein connecting with central bore 76. This construction forms part of a pilot valve assembly built into the cover 38. A cylindrical well or recess 82 is formed in casing 38 and is adapted to receive a suitable filter 83 secured to a threaded plug 84 in any suitable manner, and a tube 85 joined to the well 82 communicates with the high pressure side 2 of the regulator valve 1. Bore 79 communicates with the well 82 and has a valve orifice bushing 86 threaded therein and having an orifice 87 therethrough, the bushing terminating in a receding valve face 88 around the orifice. A non-circular valve member 89, which as shown, is in the form of a hexagonal plug, is slidably received in the bore 79 and carries a valve insert 91 at its end. The insert is adapted to seat against the slightly receding face 88 of the valve bushing 86, and a light spring 92 is interposed between valve 89 and bushing member 86.

An upper diaphragm 95 is secured at its periphery between the spring cover 96 and the upper portion of casing 38. A cylindrical connecting member 97 extends through bore 76 and at its upper end the diaphragm 95 is clamped thereto between washer 98 and diaphragm plate 99 by a cap screw 101. A spring 102 in a recess 103 in the cover 96 bears against the diaphragm 95 and by means of a threaded adjustment plug 104 in recess 103, the spring may be adjusted to exert the proper loading effect on the diaphragm 95. The outer end of recess 103 is closed by a cap 105, a suitable vent 106 being provided in cover 96.

The connecting member 97 is transversely bored at 108 and slidably receives therein a hexagonal shaped guide bearing member 109 which has tapered recesses 110 and 111 therein. A rod 112 pointed at its ends is received in the recess 113 in the valve member 89 and recess 110 of guide 109. An opposing similar rod 114 is received in the other tapered recess 111 of the guide 109 at one end and at its opposite end is received in a recess 115 of a plug 116 threaded into the threaded portion of the bore 81. Bore 81 may be sealed by a threaded pipe plug 117. As the light spring 92 biases the valve member 89, rod 112, guide 109 and rod 114 toward the plug 116, it will be apparent that the proper bias of spring 92 may be obtained by adjusting plug 116. The adjustment of plug 116 also controls or determines the amount of opening of valve 89, and, therefore, controls the rate of flow through orifice 87.

A ring 120 is spot welded in a recess 121 in the case 38 to provide a clearance 122 for flow of fluid, and a diaphragm 123 is clamped thereto at its outer periphery by a plate or cover 124. The diaphragm 123 is secured between plates 125 and 126 held on the flange 127 of the connecting member 97 by a cap screw 128 threaded into a bore in the member 97, the flange 127 of the connecting member limiting upward movement thereof by engagement with the lower end of the hub 75. Spring 134 engaging the cover 124 and lower diaphragm plate 125 substantially balances the weight of the center member 97 and parts carried thereby. The pilot regulator thus has a suitably vented spring chamber 131 a loading chamber 132 and control chamber 133. The plate 124 has a hole 135 to which is connected a conduit 136 passing through the case 38 and connecting by the external conduit 137 with the T 71 (Figure 1) or any other source of control pressure.

In order to eliminate the effect of turbulent flow on the outlet control pressure, a straightening vane 140 (Figure 1) is provided in the outlet pipe 73 and comprises two collars 141 and 142 having a plurality of tubes 143 contained therein providing a plurality of small passages for the flow of gas. The straightening vane is clamped into the outlet pipe section 73 before it is assembled to the regulator casing by means of set screws 144 contained therein. Under certain conditions the straightening vane may be omitted.

High pressure gas is led by conduit 85 to the well 82 and passes through the pilot valve orifice 87 and through the clearance provided between the valve member 89 and bore 79 and along the clearance provided between connecting member 97 and bore 76 into the chamber 132 between the diaphragms 95 and 123, and can escape through the clearance 122 between the ring 120 in the casing 38 into the upper chamber 46 to load the main diaphragm 37. The restricted orifice 52 allows a flow therethrough into passages 51, 48 and 47 in the diaphragm stem into the lower chamber 45 which is connected through the tube 68, T 71 and conduit 72 into the outlet pipe 73 of the regulator. The diaphragm 37 thus is at all times subject to the differential pressure across orifice 52 due to the loading pressure in chamber 46 and the pressure in main 73 freely transmitted by conduits 72 and 68 to chamber 45, the effect of this differential pressure being opposed or aided, as the case may be, by the inlet pressure on valve 8 and the bias of spring 24. The pressure in chamber 45 is approximately that in pipe 73 as the bleed through restriction 52 is so small as to produce substantially no pressure change in chamber 45.

The operation of the apparatus now will be described. When the differential pressure across diaphragm 37 gets too high due to the building up of pressure in chamber 46 faster than it can pass through restriction 52 so as to open valve 8 an excessive amount, and allows the pressure in conduit 73 to rise too high, the pressure in conduit 73 is transmitted to control chamber 133 through conduits 72, 137 and 136, overbalances spring 102 and moves connecting member 97 upwardly to cause rods 112 and 114 to approach alignment and thus force valve 89 against its seat to cut down or stop flow through orifice 87. However, as escape from chamber 46 through orifice 52 continues, a point is reached where the differential pressure across diaphragm 37 falls sufficiently to allow valve 8 to commence closing and thus cuts off or reduces further flow into pipe 73 until the pressure in conduit 73 falls below the desired pressure. The fall in pressure in conduit 73 allows spring 102 to again open valve 89 to permit a flow into chamber 46 and build up the differential pressure across diaphragm 37 until valve 8 commences to open again and restore the pressure in conduit 73.

The areas of diaphragms 95 and 123 are selected so as to be substantially equal and the pilot flow passes therebetween, and accordingly it will be seen that the pressure in chamber 132 has substantially no effect on these diaphragms or valve 87, which respond solely to the control pressure in chamber 133 plus the force of spring. For this reason the pilot regulator may be set for practically any control pressure in chamber 133 with the assurance that that control pressure will be maintained within very close limits in the conduit 73. As an example of the wide range of control of a regulator built in accordance with this invention, the pressure in pipe 73 may be controlled at any pressure from about 2 ounces per square inch up to the limit provided by spring 102, and by substituting a stiffer spring at 102 the range may be further increased. The lower limit may be decreased or a vacuum may be controlled by eliminating spring 134.

The valve guide 14 is of such shape as to require considerable movement thereof before the flow through orifice 16 builds up. This construction eliminates pulsation or vibration of the valve. If desired, spring 24 may be omitted, in which case the inlet pressure on valve 8 will be relied on to close this valve. It will be seen that the pilot flow from chambers 46, returns to the line 73, thus eliminating the hazard of gas escaping to the air. Also by adjustment of plug 116 to determine the ratio of opening of orifice 87 to movement of valve 89, the sensitivity of the system may be varied. Any desired pressure in chamber 46 may be secured, and the casing 38 therefore need not be made strong enough to withstand the full inlet pressure of the regulator. Relief valves 54 and 55 are provided to allow rapid equalization of pressure across chambers 45 and 46 in the event of a surge of pressure. However, in ordinary operation valves 54 and 55 remain closed.

In the modification shown in Figures 5 to 8, wherein like parts are indicated by like reference numerals, the upper diaphragm cover 150 has a central raised shoulder 151 and the diaphragm 123 of the pilot regulator is clamped to the shoulder by the pilot regulator body 152 by bolts 153 which also serve to clamp the upper diaphragm between the body 152 and the cover 154. A hole 155 is drilled through the flange or shoulder 151 and connects balancing chamber 132 with the upper main diaphragm chamber 46. The diaphragm 37 is clamped between the plates 40 and 41 by means of a flanged bushing 156 and nut 157 threaded thereon, and a small orifice 158 in the bushing provides for flow from chamber 46 to chamber 45. The control pressure for chamber 133 is conducted thereto through a bore 159 extending along radial rib 160 in the top cover 150 which is connected by passage or vertical bore 161 extending through the flanges of the upper and lower diaphragm covers 150, 165 with the bore 67 in the lower case 165.

The pilot valve is constructed to prevent crushing of the valve member against its seat. For this purpose plug 116 of Figures 1 and 3 is replaced by a threaded thimble 166 (Figure 5) threaded into the bore 81 and is locked in position by a lock bushing 167. A spring 168 in the recess 169 of the thimble abuts the back wall thereof and urges a plug 170 toward the center, the plug 170 being recessed to receive the end of rod 114. In this construction, when the valve 89 is closed, the force urging the valve 89 against its seat is cushioned by the spring 168 to prevent crushing of the valve insert. The sensitivity of the valve may be adjusted by adjustment of thimble 166 and lock bushing 167.

The main valve stem 171 has a rounded end 172 engaging the end wall of bushing 156, and is guided by a combined guide and cage member 173 comprising a shouldered orifice bushing 174 threaded into orifice 5 to provide a sharp edge valve 7, and an integral guide sleeve 175 connected thereto by spaced ribs 176 to allow for flow of gas therebetween. An accurately machined portion 177 fits closely in a bore 178 in the casing 1 to accurately center the guide. The cover 165 is bolted to the valve body 1 by suitable bolts 179, a gasket 180 being interposed to prevent leakage, and a shoulder 181 on the sleeve 175 abuts the gasket and wall of case 165. Sleeve 175 has a bore 182 therethrough providing a close working fit with the stem 171 whereby the stem operates freely therein and leakage through the clearance between the stem and sleeve is reduced. This clearance may be on the order of a few thousandths of an inch difference in diameters and is smaller than 1/3 to 1/7 of the area of passage 67. The sleeve 175 may be extended into the chamber 45, as indicated at 183 to provide a longer guide bore. Valve stem 171 has a shoulder 184 against which abuts the guide 185 and a valve disc 186 abutting the guide 185 is held in position by a cap 187 threaded on the end 188 of the valve stem.

It will be observed that in this modification the valve stem 171 is separate from the diaphragm 37 and is biased into contact therewith by spring 24, which also biases valve 186 into closed position. The chamber 46 accordingly is made of reduced volume and in connection with small vent 158 pulsation or vibration of the diaphragm and valve is eliminated.

In this modification, the safety valves 189 and 190 (Figures 7 and 8) are located externally where they are accessible for repair or replacement. Top cover 150 has two radial ribs 191 and 192, each having a hole 193 drilled therethrough from chamber 46 connecting with a vertical socket 199 which is threaded at the bottom and connects with lower chamber 45 by the vertical bore 194 and horizontal bore 195. A cap 196 is threaded at 200 into socket 199 and encloses the safety valve and provides a cylindrical chamber 197 connecting by a clearance space 198 with the bore 193. Valves 189 and 190 are constructed like valves 54 and 55 except for a longer body. Valve 189 allows excess pressure in chamber 46 to escape into chamber 45, and valve 190 allows excess pressure in chamber 45 to escape into chamber 46.

The improved pilot regulator may be modified to be controlled by the back pressure of the main regulator by a few simple changes. For example, in Figure 5, passage 159 may be plugged, a hole formed connecting well 82 with control chamber 133 and the toggle rods 112 and 114 reversed. The reversal of the toggle rods is accomplished by screwing thimble 166 and lock bushing 167 outwardly until the center member 97 can be moved upwardly sufficiently to shift the toggle joint to the upper side of its center position, and the thimble 166 and bushing 167 are then screwed in until the proper adjustment is obtained. In this modification the high pressure in main 2 acts as the control pressure in control chamber 133, and the high pressure bleeds through valve orifice 87 and through passage 151 into chamber 46. The regulator system as thus modified maintains the back pressure in main 2 constant.

It will be apparent that various modifications of my invention may be made without departing from the spirit or scope thereof. What I claim as my invention is:

1. In a fluid pressure regulating system, the combination of high and low pressure mains, a valve for controlling the passage of fluid therebetween, means responsive to fluid pressure to govern the operation of said valve, a conduit to conduct flowing fluid from the high pressure main to one side of said means to bias said means, means providing a restricted passageway for conducting said flowing fluid to the opposite side of said means and discharging said restricted flow into said low pressure main, means to bias said valve against the bias of said first means, means responsive to a control pressure from one of said mains to control the pressure of flowing fluid on said first mentioned means, and means subject to the pressure of the flowing fluid and co-operating with said latter means to balance out the effect of changes in pressure of said flowing fluid thereon.

2. In a fluid pressure regulating system, the combination of high and low pressure mains, a valve for controlling the passage of fluid therebetween, means responsive to fluid pressure to govern the operation of said valve, a conduit to conduct flowing fluid from the high pressure main to one side of said means, means providing a restricted flow for conducting said flowing fluid to the opposite side of said means, means discharging said restricted flow into said low pressure main, a second valve in said conduit, a diaphragm connected to said second valve and subject to said flowing fluid on one side and responsive to a control pressure on the other side from one of the mains to govern the pressure of flowing fluid on said first mentioned means, and a second diaphragm connected to said first diaphragm in spaced relation thereto and of substantially the same area as the first diaphragm, and co-operating with said first diaphragm to balance out the effect of changes in pressure of said flowing fluid thereon.

3. In a fluid pressure regulating system, the combination of high and low pressure mains, a valve for controlling the passage of fluid therebetween, a main diaphragm to govern the operation of said valve, a conduit to conduct flowing fluid from the high pressure main to one side of said diaphragm, means providing a restricted flow for conducting said flowing fluid to the opposite side of said diaphragm, means conducting said restricted flow into said low pressure main, means to normally bias said valve to closed position, a second valve in said conduit, a second diaphragm connected to said second valve having one side subject to said flowing fluid and having the other side subject to a control pressure from one of the mains to govern the pressure of flowing fluid on said first diaphragm, and a third diaphragm connected to said second diaphragm in spaced relation thereto and of substantially the same area as the second diaphragm and co-operating with said second diaphragm to balance out the effect of changes in pressure of said flowing fluid thereon.

4. In a fluid pressure regulating system, the combination of high and low pressure mains, a valve for controlling the passage of fluid therebetween, means responsive to fluid pressure to govern the operation of said valve, a conduit to conduct flowing fluid from the high pressure main to said means, and including a fluid chamber having an inlet and an outlet, a restricted opening for conducting fluid from said means, a valve for said inlet, a diaphragm subject to the pressure in said chamber, a second diaphragm connected in spaced relation to the first diaphragm and subject on one side to the pressure in said chamber and on the other side to a control pressure, means connecting said valve with said diaphragms comprising a plurality of pivoted toggle links normally positioned off center, and means for adjusting the lever ratio of the toggle links.

5. In a fluid pressure regulating system, the combination of high and low pressure mains, a valve for controlling the passage of fluid therebetween, means responsive to fluid pressure to govern the operation of said valve, a secondary pressure chamber, a conduit to freely conduct flowing fluid from the secondary pressure chamber to load said first mentioned means, means providing a restricted outlet for escape of fluid from said first mentioned means, pressure responsive means subject on one side to the pressure in the secondary pressure chamber and on the other side to a control pressure, a second-pressure responsive means subject to the pressure of the fluid in the secondary pressure chamber and interconnected with the first pressure responsive means.

6. In a fluid pressure regulating system, the combination of high and low pressure mains, a valve for controlling the passage of fluid therebetween, means responsive to fluid pressure to govern the operation of said valve, a secondary pressure chamber, a conduit to freely conduct flowing fluid from the secondary pressure chamber to load said first mentioned means, means providing a restricted outlet for escape of fluid from said first mentioned means to the low pressure main, pressure responsive means subject on one side to the pressure in the secondary pressure chamber and on the other side to a control pressure, a second pressure responsive means subject to the pressure of the fluid in the secondary pressure chamber and interconnected with the first pressure responsive means, and spring means biasing said first mentioned means to oppose the force of the flowing fluid thereon.

7. In a fluid pressure regulating system, the combination of high and low pressure mains, a valve for controlling the passage of fluid therebetween, fluid pressure responsive means to govern the operation of said valve providing chambers on opposite sides thereof, a conduit connected to conduct flowing fluid under pressure to one said chamber, means providing a restricted outlet for escape of fluid from said chamber, a second conduit to conduct fluid pressure to the other of said chambers, spring means biasing said valve against the force exerted on said means by the differential pressures in said fluid chambers, a diaphragm subject on one side to the pressure in the first mentioned conduit and on the other side to a control pressure and a second diaphragm subject to the pressure in the first mentioned conduit and interconnected with the first mentioned diaphragm.

8. In a fluid pressure regulating system, the combination of high and low pressure mains, a valve for controlling the passage of fluid therebetween, fluid pressure responsive means to govern the operation of said valve providing chambers on opposite sides thereof, a conduit connected to conduct flowing fluid under pressure to one said chamber, means providing a restricted outlet for escape of fluid from said chamber, means connecting the low pressure main to the other of said chambers, a diaphragm subject on one side to the pressure in the first mentioned conduit and on the other side to a control pressure, and a second diaphragm subject to the pressure in the first mentioned conduit and interconnected with the first mentioned diaphragm.

9. In a fluid pressure regulating system, the combination of high and low pressure mains, a valve for controlling the passage of fluid therebetween, pressure responsive means to govern the operation of said valve, a conduit to conduct pilot flowing fluid from the high pressure main, a valve in said conduit, a diaphragm connected to said second mentioned valve and subject to said pilot flowing fluid on one side and responsive to a control pressure on the other side, and a second diaphragm secured in spaced relation to said first diaphragm and of substantially the same area as the first diaphragm and spaced therefrom to form a chamber therewith subject to the pilot flowing fluid and to balance out the pressure of the flowing fluid thereon, and means for connecting said chamber to said first mentioned means, and restricted means for conducting fluid from said first mentioned means.

10. In a fluid pressure regulating system, the combination of high and low pressure mains, a valve for controlling the passage of fluid therebetween, pressure responsive means to govern the operation of said valve, a pilot flow conduit to conduct flowing fluid from the high pressure main, a valve in said conduit, a diaphragm subject to said pilot flowing fluid on one side and responsive to a control pressure on the other side, toggle links connecting said diaphragm and second mentioned valve, a second diaphragm secured to the first diaphragm of substantially the same area as the first diaphragm and forming a chamber therewith subject to said flowing fluid, means for connecting said chamber to said first mentioned means, and restricted means for conducting fluid from said first mentioned means.

11. In a fluid pressure regulating system, the combination of high and low pressure mains, a valve for controlling the passage of fluid therebetween, means responsive to fluid pressure to govern the operation of said valve, a conduit to conduct a pilot flow of fluid from the high pressure main, a valve in said conduit, a second pressure responsive means connected to said second mentioned valve subject to said pilot flow of fluid and responsive to a control pressure from one of said mains to control the pressure of the pilot flow of fluid on said first mentioned means, and means to adjust the ratio of valve travel to travel of said second means to adjust the sensitivity of said system.

12. In a fluid pressure regulating system, the combination of high and low pressure mains, a valve for controlling the passage of fluid therebetween, means responsive to fluid pressure to govern the operation of said valve, a conduit to conduct a pilot flow of fluid to said means, restricted means to conduct the pilot flow from said first mentioned means, a valve in said conduit, a second pressure responsive means connected to said second mentioned valve subject to said pilot flow of fluid and responsive to a control pressure to control the pressure of the pilot flow of fluid on said first mentioned means, a third pressure responsive means subject to the pressure of the pilot flow of fluid and interconnected with the first pressure responsive means, and means to adjust the ratio of valve travel to travel of said second means to adjust the sensitivity of said system.

FREDERICK H. KINDL.